United States Patent [19]
Worbois

[11] 3,918,769
[45] Nov. 11, 1975

[54] MANUALLY OPERABLE APPARATUS FOR CUT-OFF OF BRAKE PIPE PRESSURE MAINTAINING

[75] Inventor: Robert J. Worbois, North Huntingdon, Pa.

[73] Assignee: Westinghouse Air Brake Company, Wilmerding, Pa.

[22] Filed: Feb. 21, 1975

[21] Appl. No.: 551,629

[52] U.S. Cl. .................................. 303/66; 303/18
[51] Int. Cl.² ....................................... B60T 15/36
[58] Field of Search ............ 303/13, 14, 18, 59, 66, 303/86

[56] References Cited
UNITED STATES PATENTS

| | | | |
|---|---|---|---|
| 2,676,065 | 4/1954 | Gorman et al. .................... | 303/18 |
| 3,799,624 | 5/1974 | Linhart ............................... | 303/66 |

*Primary Examiner*—Duane A. Reger
*Attorney, Agent, or Firm*—W. F. Poore; R. W. McIntire, Jr.

[57] ABSTRACT

This invention relates to a locomotive brake control apparatus that includes a manually operative self-lapping type of engineer's brake valve device having a relay valve device for controlling variations of the pressure in a train brake pipe that extends from the locomotive through each car in the train and manually operable means disposed exteriorly of the train brake pipe and selectively operable to enable cut in or cut out of maintaining of the pressure in the train brake pipe, notwithstanding leakage therefrom, by the self-lapping relay valve device of the engineer's brake valve device upon movement of the handle of this brake valve device out of its release position.

4 Claims, 1 Drawing Figure

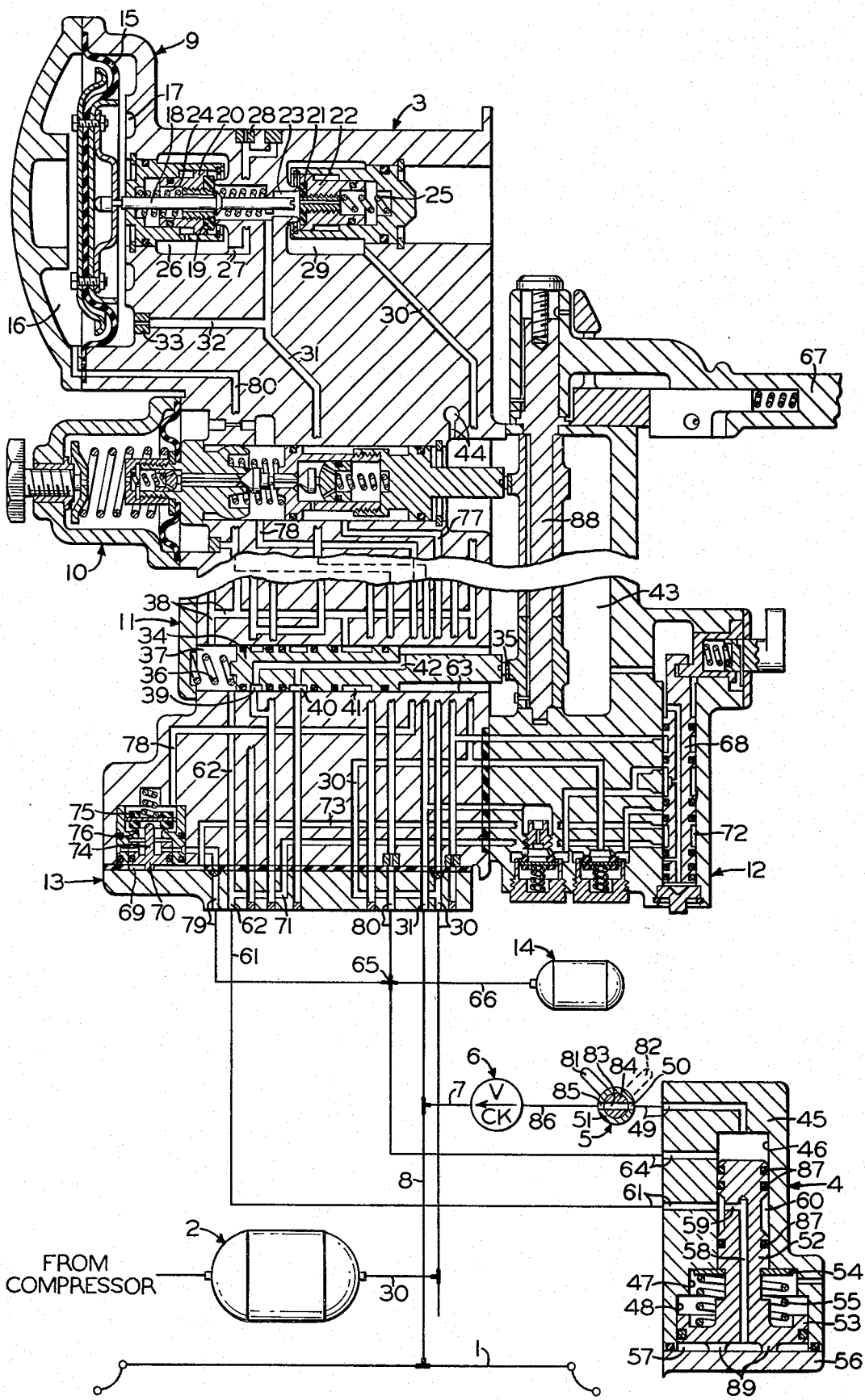

MANUALLY OPERABLE APPARATUS FOR CUT-OFF OF BRAKE PIPE PRESSURE MAINTAINING

BACKGROUND OF THE INVENTION

There is shown in U.S. Pat. No. 3,799,624 issued Mar. 26, 1974, to Harry M. Linhart and assigned to the assignee of the present application, a self-lapping type of engineer's brake valve device that includes a relay valve device operable, while a brake application is in effect, to maintain substantially constant the reduced pressure in the train brake pipe against leakage of fluid under pressure therefrom and a valve means that includes a piston-operated valve device disposed in a communication between the relay valve device and the train brake pipe and a manually operable valve device for so controlling the piston-operated valve device as to enable the selective cutting in or out the supply of fluid under pressure from the relay valve device to the train brake pipe thereby placing brake pipe pressure maintaining at the discretion of the engineer.

Since this piston-operated valve device is disposed in the communication between the relay valve device and the train brake pipe, it is necessarily excessively large and bulky in order to handle without restriction the quantity of fluid under pressure flowing to and from the train brake pipe via this communication. Consequently, this valve means requires a considerable amount of material for its manufacture and, therefore, in these days of inflation, is expensive.

Accordingly, it is the general purpose of this invention to provide a small, simple and inexpensive manually operable means disposed exteriorily of the communication between the relay valve device of a self-lapping type of engineer's brake valve device and a train brake pipe for association or use with this type of engineer's brake valve device, whereby brake pipe pressure maintaining by the supply of fluid under pressure from the relay valve device to the train brake pipe may be manually cut in or out at the discretion of the engineer upon movement by him of the handle of this brake valve device out of its release position.

SUMMARY OF THE INVENTION

According to the present invention, there is provided for use with an engineer's brake valve device having a self-lapping relay valve device for controlling variations of pressure in a train brake pipe extending from a locomotive through each car in the train, a manually operable means that is disposed exteriorily of the train brake and selectively operable, at the discretion of the engineer, to render the self-lapping relay valve device operative or inoperative to maintain substantially constant the reduced pressure in the train brake pipe, while a brake application is in effect, notwithstandiing leakage therefrom. The manually operable means constituting the present invention comprises a fluid pressure operated cut-off valve device, a manually operable cut-out valve device and a check valve device arranged in series in a conduit connected at one end to an equalizing reservoir and at the opposite end to the train brake pipe, the check valve device being so disposed as to enable flow in the direction from the equalizing reservoir to the train brake pipe and prevent flow in the opposite direction. Fluid under pressure is supplied to a spring biased piston of the cut-off valve device only while a suppression valve of the engineer's brake valve device occupies its release position to thereby operate this valve device to cut off flow of fluid under pressure from the equalizing reservoir to the train brake pipe. Manual movement of the handle of the engineer's brake valve device out of its release position effects corresponding movement of the suppression valve out of its release position to effect release of fluid under pressure from the spring biased piston of the cut-off valve device whereupon this valve device establishes a communication via which fluid under pressure may flow from the equalizing reservoir to the train brake pipe. Consequently, while backing up a train, the release of fluid under pressure from the train brake pipe independently of the engineer's brake valve device, effects a corresponding release of fluid under pressure from the equalizing reservoir thereby rendering the relay valve device of the engineer's brake valve inoperative to effect the supply of fluid under pressure to the train brake pipe and thus cutting out brake pipe pressure maintaining subsequent to movement of the brake valve handle out of its release position.

IN THE ACCOMPANYING DRAWING:

The single FIGURE is a diagrammatic view of a self-lapping type of engineer's brake valve device, shown partly in section, connected by suitable pipes to the usual main reservoir, equalizing reservoir and train brake pipe, and to a novel manually operable means that enables the engineer, at his discretion, subsequent to movement by him of the handle of the engineer's brake valve device out of its release position, to selectively render the self-lapping relay valve device of this brake valve device operative or ineffective to maintain substantially constant the reduced pressure in the train brake pipe while a brake application accomplished independently of this brake valve device is in effect, notwithstanding leakage of fluid under pressure from the train brake pipe.

Referring to the drawing, a locomotive brake control apparatus embodying the invention comprises a brake pipe 1 that extends from end to end of the locomotive pipe and thence through each car in a train that may be hauled thereby, a main reservoir 2, a manually operated engineer's automatic brake valve device 3 to enable the engineer on the locomotive to control the pressure in the brake pipe 1, a fluid pressure operated brake pipe pressure maintaining cut-in and cut-out valve device 4, a manually operable cut-out valve device 5 which may be of the ball type for establishing or cutting off a communication between the cut-in cut-out valve device 4 and the inlet of a one-way flow check valve device 6, the outlet of which is connected by a pipe 7 to a branch pipe 8 that connects the brake pipe 1 to the engineer's brake valve device 3.

The manually-operated engineer's automatic brake valve device 3 is of the self-lapping type such as that disclosed in U.S. Pat. No. 2,958,561, issued Nov. 1, 1960, to Harry C. May, and assigned to the assignee of the present application.

The brake valve device 3 comprises a self-lapping relay valve device 9, a self-lapping regulating or control valve device 10, a suppression valve device 11, a cut-off valve device 12, and an equalizing reservoir cut-off valve device 13 that is operated to an open position by fluid under pressure supplied thereto while the cut-off valve device 12 occupies the position in which it is shown in the drawing to provide for charging of an equalizing reservoir 14 by the supply of fluid under pressure thereto from the regulating valve device 10.

Relay valve device 9 comprises a diaphragm 15, which is subject opposingly to fluid pressures in a chamber 16 and a chamber 17 and is adapted through the medium of a coaxially arranged operating stem 18 to effect unseating of a disc-shaped exhaust valve 19 carried by an annular valve member 20, or effect unseating of a disc-shaped supply valve 21 carried by a coaxially arranged annular valve member 22, according to whether pressure in chamber 16 is less than or exceeds the pressure in chamber 17. Stem 18 is coaxially connected to the chamber 17 side of diaphragm 15 and projects centrally through valve member 20 and through a chamber 23 and is adapted to abut one end of supply valve member 22. Helical springs 24 and 25 urge the valve members 20 and 22 toward each other for normally concurrently seating the valves 19 and 21. Exhaust valve 19 controls communication between chamber 23 and a chamber 26 which is open to atmosphere via a passageway 27 and an exhaust choke 28, whereas supply valve 21 controls communication between chamber 23 and a supply chamber 29 that is always open to the main reservoir 2 via a passageway and correspondingly numbered pipe 30.

The chamber 23 is connected to one end of the hereinbefore-mentioned branch pipe 8 via a passageway 31, there being disposed in this passageway a brake pipe cut-off valve device (not shown) and a vent valve device (not shown) since these valve devices form no part of the present invention. A passageway 32 in the brake valve device 3 opens at one end into the passageway 31 intermediate the ends thereof and at the other end into the chamber 17 of the relay valve device 9 via a choke 33. It will be understood that the brake pipe cut-off valve device and the vent valve device which are not shown in the drawing operate in the same manner as the cut-off valve device and vent valve device shown and described in the above-mentioned U.S. Pat. No. 2,958,561.

The suppression valve device 11 comprises a spool-type suppression valve 34 that is biased into operative contact with an operating cam 35 by a spring 36 and fluid under pressure supplied to a chamber 37 from the main reservoir 2 via the pipe and passageway 30 and a passageway 38 that at one end opens into the chamber 37 and at the other into the passageway 30 intermediate the ends thereof. Intermediate its ends, the spool valve 34 is provided with three spaced-apart elongated peripheral annular grooves 39, 40 and 41. The grooves 39 and 40 are always open to atmosphere via a passageway 42 in the valve 34 and a chamber 43 in the brake valve device 3 which chamber is open to the exterior of this brake valve device via a passageway 44.

The fluid pressure operated brake pipe pressure maintaining cut-in and cut-out valve device 4 may be located in any convenient location on a locomotive and comprises a casing 45 that has therein a bottomed bore 46 and two coaxial counter-bores 47 and 48. Opening into the upper end of the bottomed bore 46 is one end of a passageway 49 that extends through the casing 45 and is connected by a correspondingly numbered pipe to an inlet port 50 provided in a body 51 of the hereinbefore-mentioned manually operable cut-out valve device 5.

Slidably mounted in the bottomed bore 46 is a spool-type valve 52 that has formed integral therewith a piston 53 that is slidably mounted in the counterbore 48 in the casing 43.

Surrounding the spool valve 52 and interposed between the upper side of the piston 53 and an annular spring seat 54 that is disposed in the counterbore 47 is a spring 55 that is effective to bias the piston 53 against a cover member 56 that is secured to the casing 45 by any suitable means (not shown) in the absence of fluid under pressure in a chamber 57 formed between this cover member 56 and the piston 53.

Extending upward from the lower face of the piston 53 and into the spool valve 52 is a bottom bore 58 the upper end of which is connected by a cross bore 59 to the surface of an elongated peripheral annular groove 60 formed on the spool valve 52.

Opening at the wall surface of the bottomed bore 46 and in alignment with the cross bore 59 in the spool valve 52, while this valve occupies the position shown in the drawing, is one end of a passageway 61 that is connected by a correspondingly numbered pipe to one end of a passageway 62 in the brake valve device 3. As shown in the drawing, the other end of this passageway 62 opens into the hereinbefore-mentioned chamber 37 at the wall surface of a bore 63 in which the spool-type suppression valve 34 is slidably mounted at a location that is on the left-hand side of the suppression valve 34 while this valve occupies its release position in which it is shown in the drawing.

Opening at the wall surface of the bottomed bore 46 above the location at which the passageway 61 opens at this wall surface is one end of a passageway 64 that is connected by a correspondingly numbered pipe to a first outlet of a pipe cross 65. Connected to a second outlet of the pipe cross 65 is one end of a pipe 66 that has its other end connected to the hereinbefore-mentioned equalizing reservoir 14.

As shown in the drawing, the manually operable cut-out valve device 5 is disposed between the brake pipe pressure maintaining cut-out and cut-in valve device 4 and the inlet of the one-way flow check valve device 6. It should be understood, however, that these three valve devices 4, 5 and 6 may be randomly disposed in series in a conduit extending between the equalizing reservoir 14 and the brake pipe 1 without effecting their individual or collective functions so long as the one-way flow check valve device 6 is so arranged as to provide for flow of fluid under pressure from the equalizing reservoir to the brake pipe 1 and prevent flow in the opposite direction.

For example, if any one of the three valve devices 4, 5 and 6 is arranged in the series in the location that any one of the other two valve devices is shown in the drawing, the operation of the novel brake pipe pressure maintaining cut-in and cut-out means constituting the present invention is not changed in any manner whatsoever.

OPERATION

To initially charge the locomotive brake control apparatus shown in the drawing, internal combustion engines are started for operating fluid compressors (not shown) to effect charging of the main reservoir 2.

It may be assumed that a handle 67 of the engineer's automatic brake valve device 3 is in its release position in which it is shown and that a spool-type valve 68 of the manually operated cut-off valve device 12 occupies the position shown in the drawing. Therefore, fluid under pressure will flow from the main reservoir 2 to a chamber 69 below a piston 70 of the equalizing reservoir cut-off valve device 13 via pipe and passageway 30, passageway 38, chamber 37, passageway 62, a passageway 71 in the brake valve device 3, an elongated peripheral annular groove 72 on the spool-type valve 68 and a second passageway 73 in the brake valve device 3. This supply of fluid under pressure to the chamber 69 is effective to move the piston 70 upward and, via a stem 74, unseat a flat disc-type valve 75 from an annular valve seat 76. Therefore, while the brake valve handle 67 is in its release position, the self-lapping regulating valve device 10 of the brake valve device 3 is effective, as explained in the above-mentioned U.S. Pat. No. 2,958,561, to supply fluid under pressure from the main reservoir 2, which is connected to this regulating valve device 7 via pipe and passageway 30 and a passageway 77, to the equalizing reservoir 14 via a passageway 78 in the brake valve device 3, past the now unseated valve 75, a passageway and correspondingly numbered pipe 79 that is connected to a third outlet of the pipe cross 65, and the pipe 66. Fluid under pressure is simultaneously supplied to the chamber 16 of the relay valve device 9 since this chamber 16 is connected to the fourth outlet of the pipe cross 65 by a passageway and correspondingly numbered pipe 80.

It may be further assumed that a handle 81 of the manually operated cut-out valve device 5 occupies the position indicated by the numeral 82 on the drawing. Therefore, a passageway 83 in a valve element 84 of the cut-out valve device 5 will be in a position to close communication between the inlet port 50 in the body 51 of this valve device 5 and an outlet port 85 in this body, it being noted that this outlet port 85 is connected to the inlet of the hereinbefore-mentioned check valve device 6 by a pipe 86.

Consequently, it is apparent that the fluid under pressure supplied to the chamber 16 of the relay valve device 9 in the manner described above will cause this valve device 9 to operate to effect the supply of fluid under pressure from the supply chamber 29, that is connected to the main reservoir 2 via the passageway and pipe 30, to the chamber 23 from whence it will flow to the train brake pipe 1 via the passageway 31 having the brake pipe cut-off valve (not shown) therein, and branch pipe 8. Thus, fluid under pressure is supplied from the main reservoir 2 on the locomotive to the train brake pipe 1 until this pipe is fully charged to the pressure normally carried therein as determined by the setting of the regulating valve device 10. Therefore, the self-lapping relay valve device 9 is rendered operative to maintain normal fully charged pressure in the train brake pipe 1 notwithstanding leakage therefrom so long as the brake valve handle 67 remains in its release position.

The brake control valves (not shown) on the locomotive and cars in the train will operate in response to the charging of the train brake pipe to effect a release of the brakes on the entire train.

A service or an emergency brake application and a subsequent release on the locomotive and cars in the train may be effected in the usual manner and need not be described in detail herein since such applications and releases are fully described in hereinbefore-mentioned U.S. Pat. No. 2,958,561.

It will be understood that so long as the handle 67 of the engineer's automatic brake valve device 3 occupies its release position, and the handle 81 of the manually operable cut-out valve device 5 occupies the position indicated on the drawing by the numeral 82, the self-lapping relay valve device 9 is automatically operative to maintain a substantially fully charged constant pressure in the train brake pipe 1 notwithstanding leakage of fluid under pressure therefrom that does not exceed the maximum amount of fluid under pressure that can be supplied per unit of time to the train brake pipe 1 by operation of the self-lapping relay valve device 9.

It will be further understood that so long as the handle 67 of the engineer's automatic brake valve device 3 occupies its release position, the spring 36 is effective to bias the suppression valve 34 to its release position in which it is shown in the drawing in which position the right-hand end of this suppression valve 34 abuts the cam 35.

While the suppression valve 34 occupies its release position in which it is shown, fluid under pressure will flow from the main reservoir 2 to the chamber 57 below the piston 53 of the brake pipe pressure maintaining cut-in and cut-out valve device 4 via pipe and passageway 30, passageway 38, chamber 37, passageway 62, pipe and passageway 61, and groove 60 on and bores 59 and 58 in spool valve 52. This supply of fluid under pressure to the chamber 57 is effective to cause the piston 53 and spool valve 52 to move upward from the position in which they are shown in the drawing to an upper position in which the upper face of the piston 53 abuts the upper end of the counterbore 48.

Adjacent the upper end of the elongated peripheral annular groove 60 on the spool valve 52, this valve is provided with two spaced-apart peripheral annular grooves in each of which is disposed an O-ring seal 87, and adjacent the lower end of this groove 60 this spool valve 52 is provided with a third peripheral annular groove in which is also disposed an O-ring seal 87. The location of the two spaced-apart peripheral annular grooves in which are disposed the two upper O-ring seals 87 is such that, while the spool valve 52 occupies its upper position in which the upper face of the piston 53 abuts the upper end of the counterbore 48, the upper one of this pair of O-ring seals 87 forms a seal with the wall surface of the bottomed bore 46 at a location above the location at which the passageway 64 opens at the wall surface of this bottomed bore 46, and the lower one of this pair of O-ring seals 87 forms a seal with the wall surface of the bottomed bore 46 below the location at which the passageway 64 opens at the wall surface of this bottomed bore 46. Consequently, it is apparent that while the spool valve 52 occupies its upper position communication is closed between pipes 64 and 49.

It should be noted that the length of the elongated peripheral annular groove 60 on the spool valve 52 is such that, while this valve 52 occupies its upper position, the O-ring seals 87 adjacent the respective opposite ends of this groove 60 form seals with the wall surface of the bottomed bore 46 at locations that are respectively above and below the location at which the end of the passageway 61 opens at the wall surface of this bottomed bore 46. Therefore, while the spool valve 52 occupies its upper position, fluid under pressure may flow from the pipe and passageway 61 to the chamber 57 below the piston 53 via the elongated peripheral annular groove 60, cross bore 59 and bottomed bore 58 to maintain this spool valve 52 and the piston 53 in their upper position in which the upper face of the piston 53 abuts the upper end of the counterbore 48.

Let it now be supposed that a train, the locomotive of which is provided with the brake control apparatus shown in the drawing, is to be backed up.

Prior to backing up the train, the engineer will move the handle 81 of the cut-out valve device 5 from the position indicated by the numeral 82 to the position in which it is shown in the drawing. This movement of the handle 81 will rotate the valve element 84 within the body 51 of this cut-out valve device 5 to the position in which it is shown in the drawing. In this position of valve element 84, the passageway 83 therein establishes a communication between the inlet port 50 and the outlet port 85 in this body 51. This outlet port 85 in the body 51 is connected to the inlet of the check valve device 6 by the pipe 86.

While a train is being backed up by a locomotive, a trainman riding on the car most remote from the locomotive may effect a release of fluid under pressure from the train brake pipe to atmosphere to cause a brake application on the entire train by manual operation of a back-up valve device (not shown) that is connected to that end of the brake pipe on this most remote car that is not connected to the next car in the train.

As fluid under pressure is thus released from the train brake pipe, fluid under pressure will flow from the locomotive through the train brake pipe extending through the cars in the train and to atmosphere via the back-up valve device connected to one end of the brake pipe on the car most remote from the locomotive to cause a reduction of the pressure in the train brake pipe. As the pressure in that part of the train brake pipe extending from the engineer's brake valve device 3 on the locomotive to the car in the train that is coupled to the locomotive is thus reduced, the relay valve device 9 of the engineer's brake valve device 3 on the locomotive would normally automatically operate in response to this reduction of pressure to effect the supply of fluid under pressure from the main reservoir 2 to the brake pipe 1 on the locomotive and thence to the train brake pipe.

Located in the cab of a locomotive is a gage (not shown) that indicates to the engineer the pressure in the brake pipe 1. Consequently, when the pressure in the brake pipe 1 on the locomotive is reduced by the release of fluid under pressure from the train brake pipe via the back-up valve device on the car most remote from the locomotive, the pressure-indicating hand of the gage connected to the brake pipe 1 on the locomotive will move in the direction to indicate to the engineer on the locomotive that the pressure in the train brake pipe is being reduced in response to the manual operation by the trainman on the car most remote from the locomotive of the back-up valve device on this most remote car.

Likewise, when the relay valve device 9 of the engineer's brake valve device 3 on the locomotive operates in response to the reduction of the pressure in the brake pipe 1 to effect a supply of fluid under pressure from the main reservoir 3 to the brake pipe 1, an indicator hand of a flow indicator device (not shown) that indicates flow of fluid under pressure from the main reservoir 2 to the brake pipe 1 via pipe and passageway 30, relay valve device 9, passageway 31 and branch pipe 8 will move to indicate this flow of fluid under pressure and thereby apprise the engineer of the fact that this relay valve device 9 is operating to effect the supply of fluid under pressure from the main reservoir 3 to the train brake pipe to compensate for the fluid under pressure released from the train brake pipe to atmosphere via the back-up valve device on the car most remote from the locomotive.

When the engineer on the locomotive ascertains by observance of the movement of the respective indicating hand of the above-mentioned gage and flow indicator device that fluid under pressure is being supplied from the main reservoir 2 to the brake pipe 1 by operation of the relay valve device 9 as the result of the trainman on the car most remote from the locomotive operating the back-up valve device on this car to effect a release of fluid under pressure from the train brake pipe to atmosphere to cause a brake application on all the cars in the train, the engineer will manually move the handle 67 of the brake valve device 3 arcuately out of its release position and to a position in its application zone in which the self-lapping relay valve device 9 of this brake valve device 3 is effective to cause a chosen reduction of pressure, such as, for example, six pounds per square inch, in the train brake pipe.

As the brake valve handle 67 is manually moved arcuately from its release position to the above-described position in its application zone, a cam shaft 88, on which the cam 35 is mounted and to which the handle 67 is secured, and the cam 35 are rotated therewith. The contour of the cam 35 is such that this rotation is effective to move the suppression valve 34 against the bias of the spring 36 from the position in which this valve 34 is shown in the drawing in the direction of the left hand to a position in which the groove 39 on this valve 34 registers with the passageway 62.

When the suppression valve 34 is moved to the position in which the groove 39 thereon registers with the passageway 62, fluid under pressure will be vented from the chamber 57 below the piston 53 of the brake pipe pressure maintaining cut-in and cut-out valve device 4 to atmosphere via bottomed bore 58, cross bore 59, groove 60, passageway and pipe 61, passageway 62, groove 39 on and passageway 42 in suppression valve 34, chamber 43 and passageway 44.

Upon the release of fluid under pressure from the chamber 57 in the manner just described, the spring 55 is rendered effective to move the piston 53 and spool valve 52 downward to the position shown in the drawing in which a pair of bosses 89 on the lower face of the piston 53 abuts the cover member 56.

When the spool valve 52 is thus returned to the position shown in the drawing, the upper O-ring seal 87 carried thereon forms a seal with the wall surface of the bottomed bore 46 at a location below the location at which one end of the passageway 61 opens at the wall surface of this bottomed bore 46. Consequently, a communication is established between the pipe and correspondingly numbered passageway 61 and the passageway and correspondingly numbered pipe 49 via the interior of the bottomed bore 46 above the upper end of the spool valve 52.

Since fluid under pressure is now being vented from the brake pipe 1 on the locomotive to atmosphere via the train brake pipe and the back-up valve device on the car most remote from the locomotive, fluid under pressure will also be vented from the chamber 17 on the right-hand side of the diaphragm 15 of the relay valve device 9 of the brake valve device 3 since this chamber 17 is connected to the brake pipe 1 via the choke 33, passageways 32 and 31 and branch pipe 8.

It is apparent from the drawing that fluid under pressure will now be vented simultaneously from the chamber 16 on the left-hand side of the diaphragm 15 of the relay valve device 9 to atmosphere via passageway and corresponding pipe 80, pipe cross 65, pipe and corresponding passageway 64, the interior of bottomed bore 46, passageway and pipe 49, inlet port 50, passageway 83 in valve element 84 which now occupies the position shown in the drawing, outlet port 85, pipe 86, one-way flow check valve device 6, pipe 7, branch pipe 8, brake pipe 1 on the locomotive, the train brake pipe extending through the cars in the train and the back-up valve device on the car most remote from the locomotive. Since the equalizing reservoir 14 is connected by the pipe 66 to the pipe cross 65, it is apparent that fluid under pressure is vented from the equalizing reservoir 14 to atmosphere simultaneously as fluid under pressure is vented from the chamber 16 on the left-hand side of the diaphragm 15 of the relay valve device 9.

As fluid under pressure is now being vented simultaneously from the chambers 16 and 17 on the respective opposite sides of the diaphragm 15 to atmosphere via the back-up valve device on the car most remote from the locomotive, it is apparent that the self-lapping relay valve device 9 is rendered ineffective to operate to effect the supply of fluid under pressure from the main reservoir 2 to the train brake pipe.

Accordingly, it will be understood that the reduction of the pressure in the train brake pipe effected by the release of fluid under pressure therefrom to atmosphere via the back-up valve device on the car most remote from the locomotive will cause the brake control valves on the locomotive and cars in the train to operate in response to this reduction of pressure to cause a service brake application on the locomotive and all the cars in the train.

It is apparent from the foregoing that the train brake pipe pressure maintaining by operation of the self-lapping relay valve device 9 of the engineer's automatic brake valve device 3 may be cut out, or nullified, whenever desired by manually moving the handle 81 of the brake pipe pressure maintaining cut-in and cut-out valve device 4 from the position indicated on the drawing by the numeral 82 to the position in which it is shown.

It should be noted, however, that, irrespective of the position of the handle 81 of the valve device 4, the self-lapping relay valve device 9 of the brake valve device 3 is always operatively effective to release fluid under pressure from the train brake pipe 1 to atmosphere to cause a brake application on the entire train whenever the handle 67 is moved to a position in its application zone or to its emergency position. Therefore, if, while the brake pipe pressure maintaining cut-in and cut-out valve device 4 occupies either its open or closed position, the handle 67 of the engineer's brake valve device 3 is moved arcuately from whatever position it occupies in a direction away from its release position, the regulating valve device 10 will operate in the manner described in hereinbefore-mentioned U.S. Pat. No. 2,958,561 to effect a reduction of the pressure in the equalizing reservoir 14 and the chamber 16 of the relay valve device 9.

As the pressure in the chamber 16 is reduced, the higher brake pipe pressure in the chamber 17 will deflect the diaphragm 15 in the direction of the left hand, as viewed in the drawing. As the diaphragm 15 is thus deflected in the direction of the left hand, it is effective, via the stem 18, to unseat exhaust valve 19 thereby establishing communication between the chamber 23 and the chamber 26 which is open to atmosphere via the passageway 27 and exhaust choke 28.

Upon the unseating of the exhaust valve 19 from its seat in the manner just described, fluid under pressure will flow from the train brake pipe 1 to atmosphere via branch pipe 8 and passageway 31, chamber 23, past the now unseated valve 19, chamber 26, passageway 27, and choke 28.

It will be noted that the chamber 17 at the right-hand side of the diaphragm 15 is connected to the passageway 31 via the choke 33 and passageway 32. Therefore, fluid under pressure will be released from the chamber 17 to atmosphere simultaneously as it is released from the train brake 1. Accordingly, fluid under pressure will be released from the train brake pipe 1 and the chamber 17 to atmosphere until the pressure in the chamber 17 is reduced to a value that is slightly less than the equalizing reservoir pressure present in the chamber 16 whereupon the spring 24 is rendered effective to move the annular valve member 20 and the exhaust valve 19 in the direction of the right hand to seat this exhaust valve 19 and thereby terminate further flow of fluid under pressure from the chamber 17 and the train brake pipe 1 to atmosphere.

From the foregoing, it is apparent that, subsequent to movement of the handle 81 of the manually operable valve device 5 from the position indicated by the reference numeral 82 to the position in which it is shown to cut out brake pipe pressure maintaining by the relay valve device 9 of the brake valve device 3, the handle 67 of this brake valve device 3 may be moved from whatever position it occupies in a direction away from its release position to cause the self-lapping relay valve device 9 to operate to release fluid under pressure from the train brake pipe 1 to atmosphere and thereby effect a brake application on the entire train in addition to that being effected by the trainman on the car most remote from the locomotive. Thus, the engineer in the cab of the locomotive retains control of the train at all times and may, at his discretion, effect a brake application on the entire train notwithstanding that brake pipe pressure maintaining by the relay valve device 9 of the engineer's automatic brake valve device 3 is cut out. It should be noted, however, that, provided the trainman has terminated the release of fluid under pressure from the train brake pipe, a direct release of such a brake application can be effected by the return of the handle 67 of the brake valve device 3 to its release position, since, upon return of the handle 67 to its release position, the suppression valve 34 will be returned to its release position in which it is shown in the drawing.

Upon the return of the suppression valve 34 to its release position, the fluid under pressure supplied from the main reservoir 2 to the chamber 37 via the pathway hereinbefore described, will flow from this chamber 37 to the chamber 57 in the maintaining cut-in and cut-out valve device 4 via passageway 62, pipe and passageway 61, groove 60, cross bore 59 and bottomed bore 58.

Upon this supply of fluid under pressure to the chamber 57, the piston 53 and spool valve 52 will be moved upward to close communication between pipes 61 and 49. Since the handle 67 of the brake valve device 3 has been returned to its release position, the self-lapping relay valve device 9 will now supply fluid under pressure to the train brake pipe 1 via the unseated supply valve 21 until the train brake pipe is fully charged to the normal pressure carried therein. This charging of the train brake pipe will effect a release of the brakes on the entire train whenever the trainman on the car most remote from the locomotive terminates the release of fluid under pressure from the train brake pipe via the back-up valve device on this car.

Having now described the invention, what I claim as new and desire to secure by Letters Patent, is:

1. A locomotive brake control apparatus for controlling the brakes on the locomotive and the cars in a train comprising the combination of:
   a. a normally charged brake pipe, variations of the fluid pressure in which are effective to control brake applications and brake releases on the locomotive and cars,
   b. a normally charged main reservoir,
   c. a normally charged equalizing reservoir,
   d. a brake valve device having:
      i. a self-lapping relay valve device which is subject to the opposing pressures in said equalizing reservoir and said brake pipe and is operative by the differential of the pressures in said equalizing reservoir and in said brake pipe to effect the supply of fluid under pressure from said main reservoir to said brake pipe to control and maintain the pressure therein notwithstanding leakage of fluid under pressure therefrom,
      ii. control valve means operative to effect the supply of fluid under pressure from said main reservoir to said equalizing reservoir to control the pressure therein, and
      iii. a multi-position valve which, in one position, effects the supply of fluid under pressure from said main reservoir to a passageway and, in the other of its positions, opens said passageway to atmosphere, and
   e. a brake pipe pressure maintaining cut-in and cut-out means wherein the improvement comprises:
      i. a conduit extending from said equalizing reservoir to said brake pipe,
      ii. a fluid pressure operated cut-in and cut-out valve device operable from an open position to a closed position in response to the supply of fluid under pressure to said passageway,
      iii. a manually operable cut-off valve device having an open and a closed position, and
      iv. a one-way flow valve device so arranged as to provide for flow of fluid under pressure from said equalizing reservoir to said brake pipe, said three valve devices being randomly disposed in series in said conduit and cooperative to enable simultaneous release of fluid under pressure from said equalizing reservoir and said brake pipe to render said self-lapping valve device ineffective to supply fluid under pressure from said main reservoir to said brake pipe in response to the release of fluid under pressure from said brake pipe independently of said brake valve device so long as said fluid pressure operated cut-in and cut-out valve device and said manually operable cut-off valve device occupy their open position thereby enabling selective cut in and cut out of maintaining a contact chosen pressure in said brake pipe notwithstanding leakage of fluid under pressure therefrom.

2. A locomotive brake control apparatus, as recited in claim 1, further characterized in that said brake valve device comprises manually operable means having a plurality of positions for controlling the operation of said control valve means and the movement of said multi-position valve from any one of its positions to another one of its positions.

3. A locomotive brake control apparatus, as recited in claim 1, further characterized in that said manually operable cut off valve comprises:
   a. a rotary valve element having a passageway therein through which fluid under pressure may flow,
   b. a casing having a bore in which said rotary valve element is rotatably mounted, and
   c. a handle secured to said rotary valve element whereby said rotary valve element is actuated by said handle from either one or two positions to the other, said passageway in said valve element in said open position establishing therethrough a communication for the flow of fluid under pressure from said cut-in and cut-out valve device to said brake pipe and in said closed position preventing said flow.

4. For use with a brake valve device having a fluid pressure operated self-lapping type relay valve device which is operated by an abutment that is subject on its respective opposite sides to the opposing pressures in an equalizing reservoir and a brake pipe and is operative by the differential of the pressures in the equalizing reservoir and the brake pipe to effect the supply of fluid under pressure from a main reservoir to the brake pipe to control and maintain the pressure therein notwithstanding leakage of fluid under pressure therefrom, a control valve means operative to effect the supply of fluid under pressure from the main reservoir to the equalizing reservoir to control the pressure therein, and a multi-position valve which, in one of its positions, establishes a communication through which fluid under pressure may be supplied to a passageway and, in the other of its positions, establishes a communication between the passageway and atmosphere, a brake-pipe-maintaining cut-in and cut-out apparatus, wherein the improvement comprises:
   a. a two-position fluid pressure operated valve device connected to the passageway for, in one position, while the multi-position valve is in its one position, closing a communication through which fluid under pressure may flow from the equalizing reservoir to the brake pipe and in the other position, while the multi-position valve is in any of its other positions, opening the communication,
   b. a manually operable cut off valve device movable from a closed position to an open position to provide for flow of fluid under pressure from said two-position fluid pressure operated valve device to the brake pipe, and
   c. a one-way flow valve device so disposed as to enable flow of fluid under pressure from said manually operable cut off valve device to the brake pipe while said valve device is in its open position thereby enabling simultaneous release of fluid under pressure from the opposite sides of the abutment of the relay valve device of the brake valve device responsive to the release of fluid under pressure from the brake pipe independently of this brake valve device to render the relay valve device inoperative to effect the supply of fluid under pressure to the brake pipe so long as fluid under pressure is released therefrom independently of the brake valve device.

* * * * *